Oct. 31, 1944.  F. E. DONOVAN  2,361,751
REINFORCED LAMINATED FIBROUS SHEET AND METHOD OF MAKING THE SAME
Filed Dec. 24, 1942
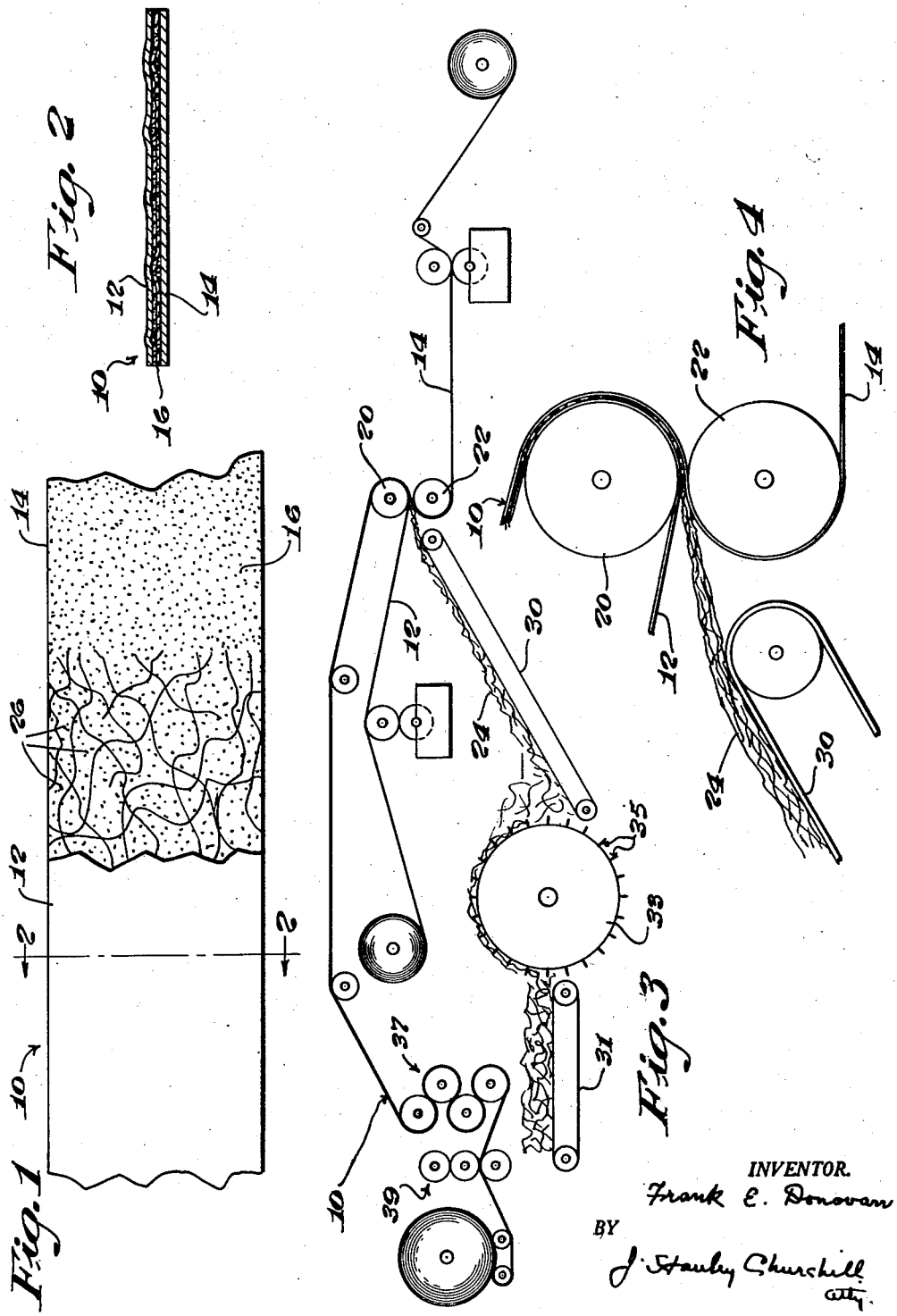
INVENTOR.
Frank E. Donovan
BY
J. Stanley Churchill
atty.

Patented Oct. 31, 1944

2,361,751

UNITED STATES PATENT OFFICE 2,361,751

REINFORCED LAMINATED FIBROUS SHEET AND METHOD OF MAKING THE SAME

Frank E. Donovan, Norwell, Mass., assignor to Specialty Converters, Inc., Braintree, Mass., a corporation of Massachusetts Application December 24, 1942, Serial No. 470,002

2 Claims. (Cl. 154—2)

This invention relates to a reinforced laminated fibrous sheet and to the method of making the same.

One object of the invention is to produce a novel construction of reinforced laminated fibrous sheet which may be economically manufactured and possesses superior strength and other characteristics as compared with prior reinforced laminated fibrous sheets of which I am aware.

A further and more specific object of the invention is to produce a novel and superior reinforced laminated paper sheet possessing superior strength and which is particularly adapted for the production of gummed tape used in sealing shipping cartons, building papers, wrapping papers, and the like.

A still further object of the invention is to provide a novel and practical method of producing the present reinforced laminated fibrous sheet.

With these general objects in view, and such others as may hereinafter appear, the invention consists in the reinforced laminated fibrous sheet and in the method of making the same hereinafter described and particularly defined in the claims at the end of this specification.

In the drawing illustrating the preferred embodiment of the invention, Fig. 1 is a plan view of a reinforced laminated fibrous sheet embodying the invention with a portion of one of the component sheets broken away to illustrate the fibrous reinforcement; Fig. 2 is a vertical cross-section on the line 2—2 of Fig. 1; Fig. 3 is a side elevation diagrammatically illustrating the apparatus preferably used for producing the present sheet in accordance with the present invention; and Fig. 4 is an enlarged detail illustrating the step of combining the two component fibrous sheets with the fibrous reinforcement, as will be described.

In general the present rinforced laminated fibrous sheet comprises two fibrous sheets adhesively secured together and having a novel fibrous reinforcement interposed between the sheets and embedded in the adhesive. The novel fibrous reinforcement, in accordance with the present invention, comprises a large number of unspun fibers of the general length and strength of short staple sisal fibers disposed in an irregular pattern and forming in effect an open mesh network made up of individual unspun fibers with the individual fibers extending in many directions. Such a reinforced laminated fibrous sheet is characterized particularly by its ability to resist tearing in all directions and the irregular extension of the individual unspun fibers making up the reinforcing network of fibers contributes to the accomplishment of this result. The fibrous sheets employed in the production of the present laminated fibrous sheet may comprise various fibrous sheet materials, but it is preferred to employ relatively strong paper for the production of reinforced laminated paper sheets suitable for use in making gummed tape, building paper, and for other industrial and commercial purposes, and while I prefer to utilize short staple sisal fibers which vary in length usually from six to twelve inches, nevertheless other fibers of equivalent characteristics may be used.

In accordance with the present method of making the improved reinforced fibrous sheet, two of the fibrous sheets to be combined are first adhesively coated with a suitable adhesive such as rubber, latex, any of the resinous adhesives, and molten asphalt or other bituminous waterproofing and adhesive composition, it being understood that the adhesive selected will depend to some extent upon the ultimate purpose for which the laminated sheet is to be used. After the fibrous sheets have been coated they are passed through combining rolls with their adhesive surfaces adjacent one another, and immediately prior to the passage of the sheets through the combining rolls a loose mass of individual unspun fibers of the character described are fed between said coated sheets so that as the sheets pass between the combining rolls the individual fibers are compressed into the form of an open mesh network embedded in the adhesive between the sheets and with the individual fibers of the network extending in many directions and some at least partially overlapping upon and crossing others. This network of fibers is preferably arranged to be coextensive with the fibrous sheets, so that there is produced a reinforced laminated fibrous sheet on which the fibrous sheets are efficiently bonded together and which possesses superior strength and is characterized particularly by its ability to offer substantial tearing resistance when torn in any direction by its increased tensile strength and also by its increased punching strength. After the laminated fibrous sheet or web has been thus produced, it is preferably passed between cooling drums to cool down the molten adhesive, if such is used, and then subjected to calendering before being wound up.

Referring now to the drawing, the novel reinforced laminated fibrous sheet indicated generally at 10 comprises two component fibrous sheets 12, 14 bonded together by an interposed adhesive layer 16. The fibrous sheets 12, 14 preferably comprise paper sheets such as kraft paper sheets although in its broader aspects other fibrous sheets may be employed, depending on the use to which the laminated sheet is to be put. The adhesive layer 16 may comprise any usual or preferred adhesive, such as a bituminous adhesive, latex, a resinous adhesive or the like, and in its preferred form the adhesive layer 16, which may comprise any of the above-mentioned adhesives, is applied to the adjacent surfaces of the fibrous layers 12, 14 prior to combining such layers. The laminated fibrous sheet thus far described is reinforced by a novel and highly efficient body of unspun fibers of the character described disposed in the adhesive layer 16 in a novel manner whereby superior strength and pliability are imparted to the laminated sheet while enabling the component fibrous sheets 14, 16 to be most efficiently bonded together, and in addition whereby maximum tearing resistance is offered when the sheet is subjected to tearing in different directions. The individual unspun fibers, preferably short staple sisal fibers, are disposed more or less at random in the adhesive layer, forming in effect an open mesh network in which the individual fibers extend in many directions, intersecting and overlapping to some extent, so that when the sheet is torn in any direction a substantial and practically uniform resistance is offered by the network of reinforcing fibers. The improved laminated sheet is also characterized by increased tensile and punching strengths.

In accordance with the preferred method of making the present reinforced laminated sheet, each fibrous sheet 12, 14 is coated with an adhesive, such as the adhesives above referred to, and then the coated sheets are conducted to between combining rolls 20, 22, in accordance with the general procedure now employed in producing unreinforced laminated paper. The fibrous reinforcement is introduced between the sheets 12, 14 just prior to their passage through the combining rolls, and accordingly a loose fluffy mass 24 of unspun fibers of the character described with the fibers extending in many directions is fed, as shown in Figs. 3 and 4, to between the coated sheets 12, 14, so that as the sheets are compressed together in passing through the combining rolls 20, 22, the loose fluffy mass of individual fibers is compressed into the form of an open network of fibers embedded in the asphaltic layer wherein the individual fibers extend at random in many directions and at least a portion of the fibers intersect and overlap. The open spaces 26 in the open network of fibers forming the reinforcement are distributed throughout the adhesive layer in sufficient number and size so that the bond between the fibrous layers 12, 14 is not diminished to any appreciable extent by the presence of the fibers.

Short sisal fibers are available on the market commercially in bale form with the individual fibers of various lengths and arranged haphazardly and entangled so that the bale constitutes a dense, tangled, coherent mass of fibers without any particular arrangement or disposition of the individual short fibers. Such short sisal fibers are to be distinguished from long sisal fibers which are available on the market commercially in hank or skein form with the strands definitely arranged longitudinally with respect to each other and not entangled, so that the individual strands can be readily separated.

In commercial practice the mass of tangled sisal fibers as they are received in bale form may and preferably will be converted in the form of a loose fluffy mat distributed over the surface of an endless conveyor 30 by combing out the fibers from the more compacted bale form until they assume a loose fluffy condition, forming a mat or ribbon of a thickness which may approximate one-half to one inch, and preferably of a width approximately that of the fibrous sheets being combined. The mat is formed on the conveyor 30 by rotating the carding drum 33 at a speed to discharge successive fluffy mass increments by centrifugal force tangentially from the upper portion of the carding drum and permitting successive increments to float by gravity onto the conveyor 30. The conveyor moves at such a speed that successively deposited mass increments are deposited upon successive portions of the conveyor 30 to form thereon the loose fluffy mat 24 of a substantially continuous nature and of a thickness which when subsequently compressed by the combining rolls 20, 22 approximates a few thousandths of an inch. By extending the delivery end of the endless conveyor 30 to near the bight of the combining rolls 20, 22, and regulating the speed at which the loose mat of fibers is delivered into the bight of the combining rolls, I have found that it is possible to regulate the density of the fibrous reinforcement in the laminated sheet. It is preferable to control the introduction of the fibers so that the amount of open space between the fibers predominates and the fibrous reinforcing network is sufficiently thin to be embedded in the adhesive coating.

In practice very satisfactory results have been secured by depositing the short staple sisal or equivalent fibers in the condition in which they are obtained by breaking up a bale thereof upon a conveyor 31 by which the mass of fibers is fed to a drum 33 having a large number of stubs or pins 35 projecting from the surface thereof. The drum functions to comb out a layer of fiber and from the drum the fibers are caused to float down through the air, as illustrated in Fig. 3, to be deposited in the desired loose fluffy condition on the end of the conveyor 30. I regard the step of floating the fibers onto the conveyor 30 in this manner as important in assisting the formation on the conveyor 30 of a uniform mass of fibers, with the individual fibers extending at random in all different directions and with a minimum of thin places over the surface of the conveyor 30.

In the event that a molten adhesive such as a resin or asphalt has been used, the web 10 is preferably first cooled by passage through cooling drums 37 and then between calender rolls 39, after which it may be immediately wound up into roll form as illustrated in Fig. 3, all as one continuous operation. If the adhesive is a cold adhesive, of course the cooling drums may be omitted.

In some instances I have found that by using a resilient roll 20 and a non-resilient roll 22 it is possible to produce a laminated fibrous sheet reinforced in the manner described with one surface of the completed sheet smooth and the other surface slightly roughened or embossed in conformity to the network of fibers between the sheets.

The present reinforced laminated fibrous sheet is characterized particularly by its superior strength, pliability and resistance to tear. In order that the reinforced paper may possess satisfactory strength and resistance to tear, I have found that short staple sisal or equivalent fibers are most satisfactory and that the density of the fibrous mat should be controlled to produce in the finished laminated sheet a reinforcement in an amount of from five to twelve pounds of fiber per one thousand square feet of the laminated sheet. The short staple sisal fiber being about two one-thousandths of an inch in thickness does not add materially to the thickness of the finished laminated sheet. In practice it has been found that when subjected to tearing tests, both lengthwise of the sheet and transversely of the sheet, substantially uniform and satisfactory results have been obtained. When torn in any direction the presence of a series of fibers extending across the line of tear offers the desired resistance to tear and renders the laminated sheet more practical and suitable for its intended purposes than prior art laminated sheets of which I am aware.

One important use of the present reinforced laminated sheet is in the production of gummed paper for sealing shipping cartons. The high resistance to tear in all directions greatly increases the utility and value of the gummed tape for such purposes.

Having thus described the invention, what is claimed is:

1. The method of making a reinforced laminated fibrous sheet resistant to tearing in all directions comprising, coating at least one of the adjacent surfaces of two fibrous webs with an adhesive binder, forming a loose fluffy mat of stiff, tangled, short, waste sisal fibers on a conveyor by passing a dense tangled mass of such fibers over a rotating carding drum rotating at a speed to discharge successive fluffy and separate mass increments by centrifugal force tangentially from the upper portion of the carding drum and permitting successive fluffy increments of said tangled fibers to float by gravity onto a conveyor, moving the conveyor at such speed that successively deposited mass increments are deposited on successive portions of the surface of the conveyor to form thereon a loose fluffy mat of a substantially continuous nature and of a thickness which when subsequently compressed approximates a few thousandths of an inch, then moving said conveyor to feed such loose fluffy mat of tangled fibers into the space between the fibrous webs just prior to their passage through combining rolls whereby as the webs and fibers pass through the combining rolls the fibers are compressed into the form of a flat open network of tangled fibers with the individual fibers bonded together and to the fibrous webs without substantially increasing the thickness of said laminated sheet and with the webs bonded to each other face to face through the openings in said flat network.

2. The method of making a reinforced laminated fibrous sheet resistant to tearing in all directions comprising, coating at least one of the adjacent surfaces of two fibrous webs with an adhesive binder, forming a loose, fluffy mat of stiff, tangled, short, waste sisal fibers on a conveyor by subjecting a dense tangled mass of such short fibers to the action of the upper portion of a rotating carding drum rotating at such speed as to spread the tangled fibers into an open formation of tangled fibers with the fibers extending in diverse directions without predetermined predominance in any particular direction and throwing the mass of tangled fibers by centrifugal force from the upper periphery of said drum and permitting the same to float down through the air by gravity onto said conveyor with the conveyor traveling at such speed that the fibers are spread out over the surface of the conveyor to provide a mat of relatively less density characterized by a predominance of interstices between the fibers, then feeding such fibers thus arranged, by means of the conveyor, into the space between the fibrous sheets, just prior to their passage through combining rolls, whereby as the sheets and fibers pass through the combining rolls the fibers are compressed into the form of a flat open network of tangled fibers with the individual fibers bonded together and to the fibrous sheets without substantially increasing the thickness of said laminated sheet and with the sheets bonded to each other face to face through the openings in said flat network.

FRANK E. DONOVAN.